(12) United States Patent
Bender et al.

(10) Patent No.: US 6,453,359 B1
(45) Date of Patent: Sep. 17, 2002

(54) SYNCHRONIZATION OF PERFORMANCE DATA IN DISTRIBUTED COMPUTER ENVIRONMENTS

(75) Inventors: Harald Bender, Steinenbronn; Juergen Holtz, Pleidelsheim, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/363,320

(22) Filed: Jul. 28, 1999

(30) Foreign Application Priority Data

Aug. 11, 1998 (DE) ......................................... 198 36 051

(51) Int. Cl.⁷ ............................................... G06F 15/16
(52) U.S. Cl. ....................................................... 709/248
(58) Field of Search ................................ 709/248, 223, 709/224, 246

(56) References Cited

U.S. PATENT DOCUMENTS 5,703,310 A * 12/1997 Kurakake et al. ............. 84/609
5,954,798 A * 9/1999 Shelton et al. ................ 379/34
6,282,570 B1 * 8/2001 Leung et al. ............... 709/224

* cited by examiner

Primary Examiner—Mehmet B. Geckil
(74) Attorney, Agent, or Firm—David M. Shofi; Anne Vachon Dougherty

(57) ABSTRACT

The present invention describes a method to synchronize performance data in a computer network system. All specified performance data of a single system collected by way of a network-wide uniformly clocked scanning interval are sorted according to their interval start time in ascending order and their actual scanning intervals in descending order. The first items of performance data sorted form the first common interval. All subsequent performance data are assigned to that interval, provided the mid point of their actual scanning interval falls within the common interval. The performance data which are no longer assigned to the first interval form the basis for a subsequent interval. The method is continued until all performance data are assigned to a common interval. The advantages of the present invention lie in the fact that the synchronized performance data are displayable in tabular form unambiguously and without gaps, and thus are available for postprocessing, for example as a bar chart. Manual evaluation is no longer necessary. The performance data can be subjected with no manual editing to a test and control program which evaluates the performance data and adapts the single systems to the specified performance data.

16 Claims, 7 Drawing Sheets

SYSTEM B

Number of intervals: 8

| Date | Start time | Interval | CPU | Z |
|---|---|---|---|---|
| MM/DD | HH.MM.SS | MM.SS | | |
| 02/02 | 08.00.00 | 11.59 | 74.0 | 0.7 |
| 02/02 | 08.00.00 | 12.00 | 74.0 | 0.9 |
| 02/02 | 08.12.00 | 11.59 | 70.5 | |
| 02/02 | 08.24.00 | 12.00 | | 1.4 |
| 02/02 | 08.24.00 | 12.00 | 75.8 | 0.8 |
| 02/02 | 08.36.00 | 11.59 | | |
| 02/02 | 08.48.00 | 12.00 | 74.1 | 1.1 |

SYSTEM B

Number of intervals: 5

| Date | Start time | Interval | CPU | Z |
|---|---|---|---|---|
| MM/DD | HH.MM.SS | MM.SS | | |
| 02/02 | 08.00.00 | 12.00 | 74.0 | 0.7 |
| 02/02 | 08.12.00 | 12.00 | 74.0 | 0.9 |
| 02/02 | 08.24.00 | 12.00 | 70.5 | 1.4 |
| 02/02 | 08.36.00 | 12.00 | 75.8 | 0.8 |
| 02/02 | 08.48.00 | 12.00 | 74.1 | 1.1 |

SYSTEM B

Number of intervals: 8

| Date | Start time | Interval | CPU | Z |
|---|---|---|---|---|
| MM/DD | HH.MM.SS | MM.SS | | |
| 02/09 | 09.30.00 | 30.00 | 16.9 | 1.5 |
| 02/09 | 10.00.00 | 29.59 | 18.0 | 1.1 |
| 02/09 | 10.30.00 | 30.00 | 17.8 | 0.8 |
| 02/09 | 10.30.00 | 14.59 | 17.9 | |
| 02/09 | 10.45.00 | 14.59 | 17.8 | |
| 02/09 | 11.00.00 | 30.00 | | 0.9 |
| 02/09 | 11.00.00 | 14.59 | 16.7 | |
| 02/09 | 11.15.00 | 15.00 | 17.0 | |

SYSTEM B

Number of intervals: 5

| Date | Start time | Interval | CPU | Z |
|---|---|---|---|---|
| MM/DD | HH.MM.SS | MM.SS | | |
| 02/09 | 09.30.00 | 30.00 | 16.9 | 1.5 |
| 02/09 | 10.00.00 | 29.59 | 18.0 | 1.1 |
| 02/09 | 10.30.00 | 30.00 | 17.8 | 0.8 |
| 02/09 | 11.00.00 | 30.00 | 17.0 | 0.9 | form unambiguously and without gaps, and thus are available for postprocessing, for example as a bar chart. Manual evaluation is no longer necessary. The performance data can be subjected, with no manual editing, to a test and control program which evaluates the performance data and adapts the single systems to the specified performance data.

SYNCHRONIZATION OF PERFORMANCE DATA IN DISTRIBUTED COMPUTER ENVIRONMENTS

FIELD OF THE INVENTION

The present invention relates to a method for synchronization of performance data with defined time intervals in distributed computer environments.

BACKGROUND OF THE INVENTION

In distributed computer environments, e.g. IBM S/390 Sysplex, performance data of the individual systems (single-system performance data) are scanned at specific intervals. The single-system performance data include in particular the CPU workload of a single system or the average response time of an I/O operation for a defined interval of a single system. Then, from the single-system performance data so-called network performance data are calculated, which are weighted as the mean value of the single-system performance data. If the network performance data exceed a defined value, the performance of every single system in the computer network must be analyzed. The analysis requires that a common interval be defined for the computer network and then that defined performance data of each single system be scanned and analyzed for that interval. The defined performance data may, for example, be the CPU workload in comparison to the average response time of I/O operations of each single system during the common interval. To make the said defined performance data of the single systems in a computer network at all comparable and—where appropriate—available for automated postprocessing, they should be scanned at the same rate, with the same time intervals. For technical reasons this can only be done with difficulty. The reasons lie in the fact that the available capacity of a system is not sufficient to scan the performance data in common mode with other systems, or that the options leading to restart of the data collector must be changed.

Based on experience, it can be assumed that the arrival of the performance data of the single systems, and the interval covered, is not uniform network-wide. The arrival time of the scanned performance data varies by milliseconds up to several minutes. The same applies to the duration of the individual intervals.

According to the current state of the art, all scanning intervals are processed in the order of their arrival. This results in tables with gaps, with rows of the same or similar time sequencing, which demands extensive manual editing by the user with a view to automated postprocessing.

It is therefore the object of the present invention to deliver a method which synchronizes the different scanning intervals of the scanned performance data of the single systems for a network-wide, clocked time interval with no significant data loss, thus making manual post-editing avoidable.

SUMMARY OF THE INVENTION

This and other objects are realized by postsynchronization of the scanned performance data. In this process, the performance data received from the single systems are sorted and edited by the following method:

1. According to their interval start time in ascending order.
2. According to their interval duration in descending order. As a result, the longest intervals can be processed first for a given interval.
3. The data sorted first form the basis for a common interval.
4. For the assignment of further data to a common interval, the mid-point time of the interval in question is taken. If it is within the common interval, the data are adopted into the common interval. If it is not, the new interval forms the basis for the next common interval.
5. Where several items of data from one system fall within one common interval, the last data record in each case is used.

The advantages of the present invention lie in the fact that the synchronized performance data are displayable in tabular form unambiguously and without gaps, and thus are available for postprocessing, for example as a bar chart. Manual evaluation is no longer necessary. The performance data can be subjected, with no manual editing, to a test and control program which evaluates the performance data and adapts the single systems to the specified performance data.

BRIEF DESCRIPTION OF THE DRAWINGS

The present invention is described in more detail on the basis of a preferred embodiment, in conjunction with diagrams showing the following.

DETAILED DESCRIPTION OF THE PREFERRED EMBODIMENT

Figure 1:
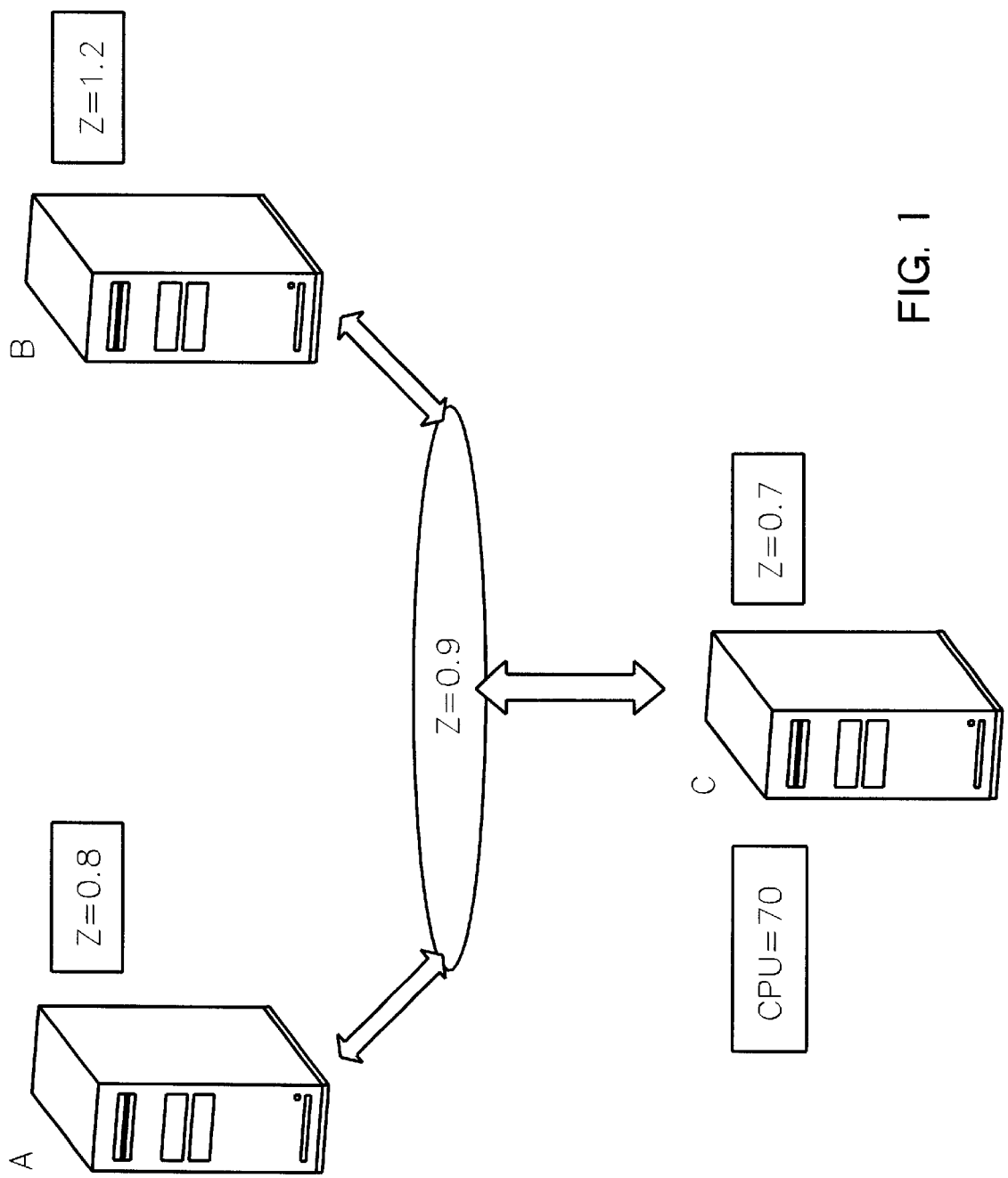
FIG. 1 shows a computer network with measured data, as forms the basis for the present invention.

FIG. 1 shows a computer network comprising three single systems. Data collectors are installed in each of the single systems. The task of the data collectors is, for example, to scan and save performance data of the single systems in order to generate a report from them. There are two different types of data in a computer network:

1. Single-system performance data; and
2. Network performance data

The single-system performance data allow the Administrator to assess the behavior of a system in isolation. The network performance data are applied to analyze the behavior of the overall computer network. The network performance data are composed of the performance data of the single systems, and are additionally represented as a mean value or weighted mean As presented in FIG. 1, the average response time of an I/O operation for a defined time interval in single system A is 0.8 seconds. Single system B delivers 1.2 seconds, and single system C 0.7 seconds. The mean value across the network is thus 0.9 seconds. Furthermore, the CPU workload on single system C is 70% as compared to the identical time interval of the single systems.

The network performance data serve to assess the behavior of the overall network. If these performance data exceed a critical threshold value, the performance data must be analyzed more closely based on the single systems. This analysis is performed with the aid of an initially tabular report. This report is generally composed of measured data definable by the users (performance characteristics), which relate a) to the scanning interval of the single system (CPU=70) or b) to the time interval, of the network. The time interval is produced from the earliest start time of a single system and the latest end time of a single system.

Figure 2A:
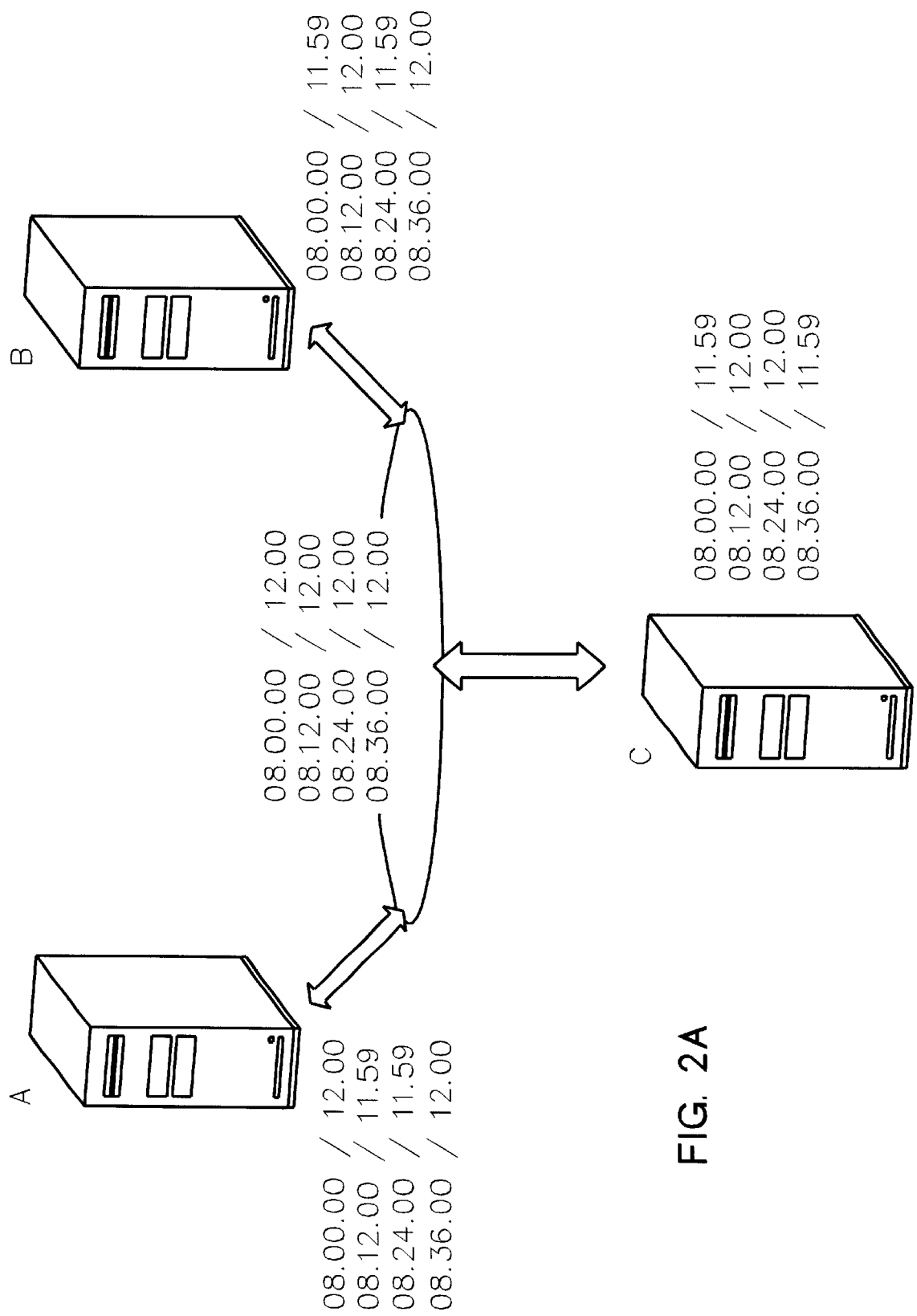
FIG. 2A shows a computer network with uniform scanning intervals with tolerance deviations, as forms the basis for the present invention.

FIG. 2A presents the case in which systems A, B and C work with identical default scanning intervals, but due to differing system workload tolerance deviations in the seconds range may occur in terms of the response times. A delivers performance data in the time interval from 8.00 to 8.12 hours. System B delivers performance data for a time interval one second shorter than system A. The same applies to system C. The common time interval of the computer network is thus 8.00 to 8.12 hours.

Figure 2B:
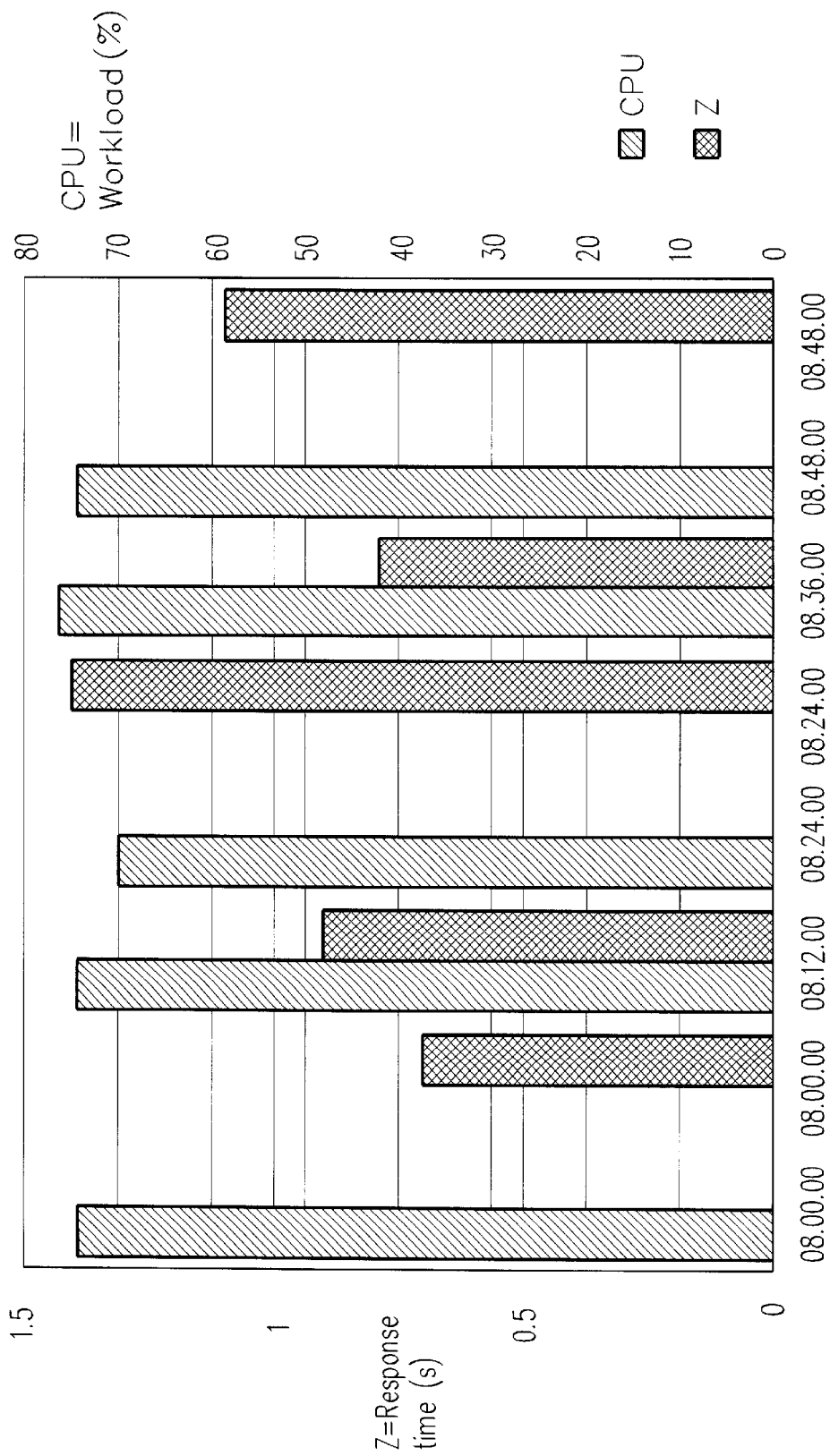
FIG. 2B shows a bar chart displaying the performance data of the single system B scanned in accordance with FIG. 2A.

FIG. 2B shows a bar chart displaying the performance data scanned in accordance with FIG. 2A for the single system B. Due to the differing response times of the scanned performance data, the bar chart is not uniform for the 12 minute interval. System B delivers performance data—namely CPU workload and average response time for I/O operations—for a specified network-wide uniform time interval at different actual scanning intervals. The actual scanning interval for the CPU workload is one second shorter than the specified time interval A of 12 minutes. The actual scanning interval for the average response time for I/O operations for system B for the specified time interval of 12 minutes is fully covered. Since the evaluation of these two items of performance data only makes sense in technical terms for a uniform cross-system time interval, the performance data represented in the bar chart must be subsequently postsynchronized in order to subject them to automated postprocessing.

Figure 3:
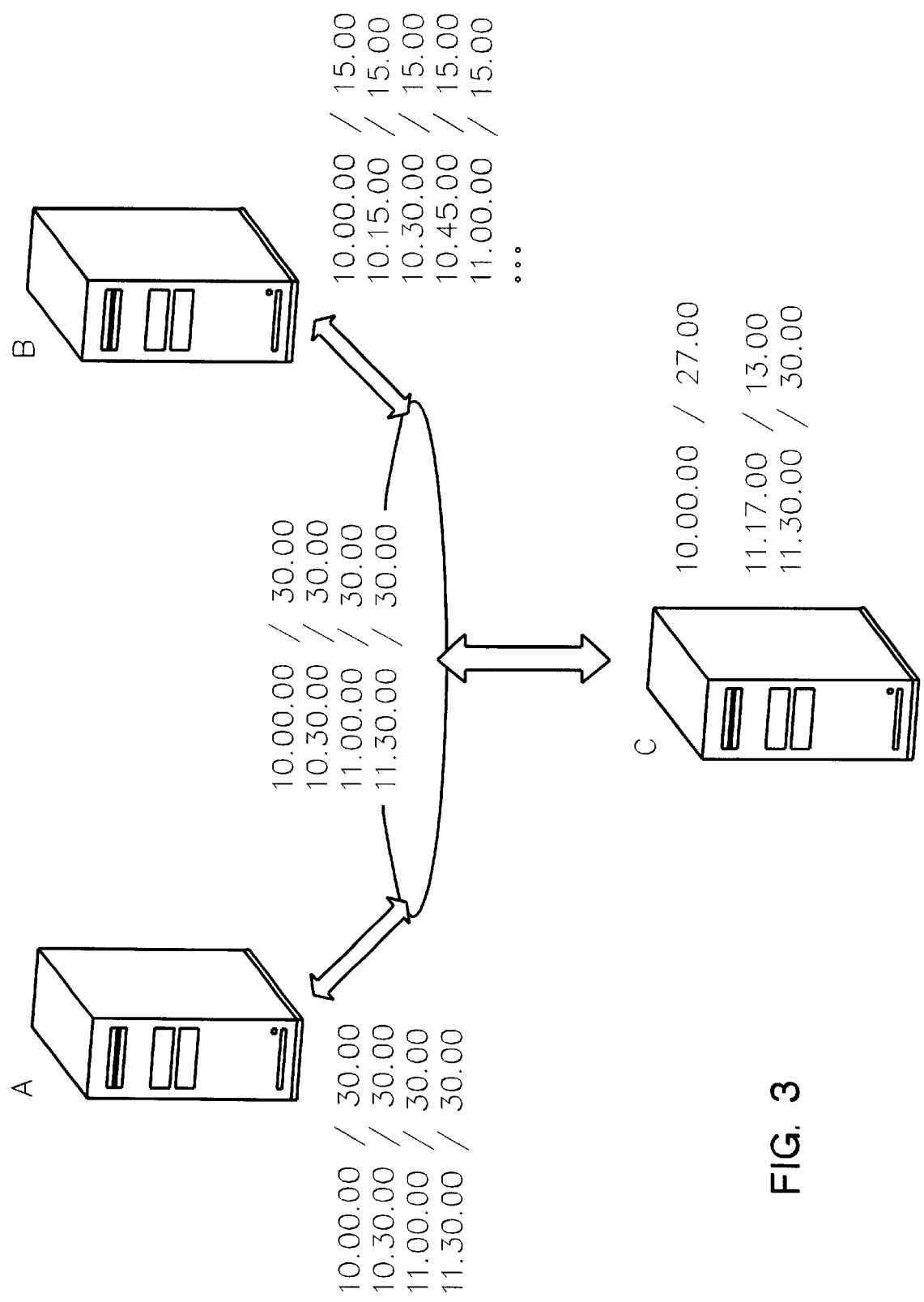
FIG. 3 shows a computer network with differing scanning intervals.

FIG. 3 presents the case in which the defaults of the scanning intervals in systems B and C are different. Differing scanning intervals can result when one system in the network is temporarily unavailable. To calculate the common time interval of the network the same rules apply as for common-mode systems.

Figure 4A:
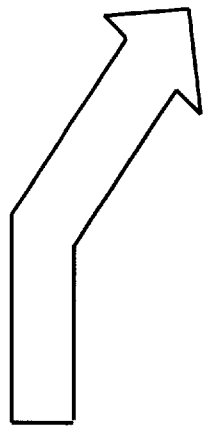
FIG. 4A shows the method presented in the invention for a computer network in accordance with FIG. 2.

FIG. 4A shows the method presented in the invention for postsynchronization of data at uniform scanning intervals in a computer network. The data collectors deliver the performance data for each single system, scanned by the single system according to a network-wide common scanning interval. The performance data for each single system comprise the CPU workload and the average response time for I/O operations. These performance data are to be scanned network-wide by each single system at a network-wide clocked scanning interval. However, differing workloads in the single systems result in differences between network-wide scanning intervals and actual scanning intervals of the single system. The following table contains the performance data in order of date MM/DD, start time (HH.MM.SS) and actual scanning interval (MM.SS) with the respective assigned performance data for single system B. The number of scanning intervals is 8. The network-wide scanning interval is 12 minutes.

| Date | Start time | Interval | |
|---|---|---|---|
| MM/DD | HH.MM.SS | CPU | Z |
| 02/02 | 08.00.00 | 11.59 | 74.0 |
| 02/02 | 08.00.00 | 12.00 | 0.7 |
| 02/02 | 08.12.00 | 12.00 74.0 | 0.9 |
| 02/02 | 08.24.00 | 11.59 | 70.5 |
| 02/02 | 08.24.00 | 12.00 | 1.4 |
| 02/02 | 08.36.00 | 12.00 75.8 | 0.8 |
| 02/02 | 08.48.00 | 11.59 | 74.1 |
| 02/02 | 08.48.00 | 12.00 | 1.1 |

In step 1, the performance data are sorted by start time in ascending order and by actual scanning interval in descending order. This is shown by the following representation of the performance data.

| | | |
|---|---|---|
| 02/02 08.00.00 | 12.00 | 0.7 |
| 02/02 08.00.00 | 11.59 74.0 | |
| 02/02 08.12.00 | 12.00 | 0.9 |
| 02/02 08.24.00 | 12.00 | 1.4 |
| 02/02 08.24.00 | 11.59 70.5 | |
| 02/02 08.36.00 | 12.00 75.8 | 0.8 |
| 02/02 08.48.00 | 12.00 | 1.1 |
| 02/02 08.48.00 | 11.59 74.1 | |

In step 2, a first common time interval is defined. The first common time interval for the measurements with the start time 8.00 is from 8.00 to 8.12. Based on the sort as presented in the invention, this time interval is unambiguously defined.

| | | |
|---|---|---|
| 02/02 08.00.00 | 12.00 | 0.7 |

Common time interval from 8.00 to 8.12.00.

In step 3 a check is made to determine which additional performance data with differing scanning intervals can be assigned to this first common time interval. This is effected in the present example by means of the mid point check. If the mid point of the actual scanning interval falls within the common time interval, it can be assigned to the common time interval. For the present example the assignment check is effected as follows:

| | |
|---|---|
| 02/02 08.00.00 | 11.59 74.0 |

Mid point of interval from 8.00.00 to 8.11.59 is 8.05.59.5. The mid point 8.05.59.5 falls within the common time interval (8.00.00<=8.12.00). Consequently:

| | | |
|---|---|---|
| 02/02 08.00.00 | 11.59 74.0 | 0.7 |
| 02/02 08.00.00 | 12.00 74.0 | 0.9 |

Mid point of interval from 8.12.00 to 8.24.00 is 8.18.00. The mid point 8.18.00 does not fall within the common time interval (8.18.00<=8.12.00 end time of common time interval). In place of the mid point check, an assignment to the common time interval can also be made where the intervals overlap within a defined range, for example 70%.

In step 4 a second common time interval is defined. This interval is the direct result of the sort in accordance with the invention. The second common time interval is from 8.12.00 to 8.24.00. Steps 1 to 4 are repeated until all performance data have been processed.

Figure 4B:
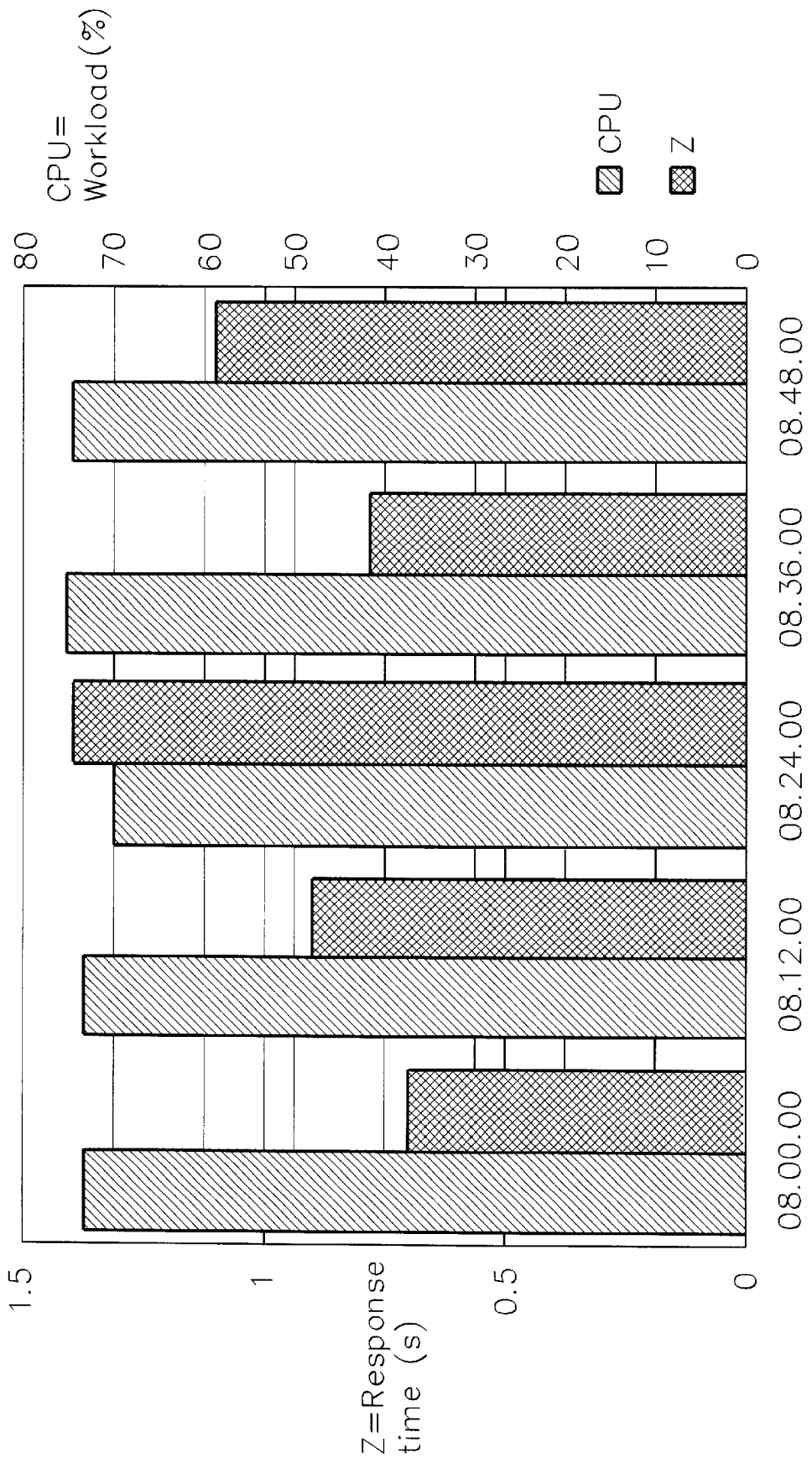
FIG. 4B shows a bar chart displaying the performance data of the single system B scanned in accordance with FIG. 2A using the method presented in the invention.

FIG. 4B shows a bar chart displaying the performance data of the single system B scanned in accordance with FIG. 2A using the method presented in the invention. All performance data are synchronized to a uniform network-wide scanning interval. The actual measurement results have been postsynchronized by the method in accordance with the invention. Consequently, by means of the method in accordance with the invention a wide variety of performance characteristics can be assigned. The need for manual editing has been eliminated. This facilitates representation of the measured data and automated postprocessing of the measured data by means of report generators for calculation of performance and capacity.

Figure 5:
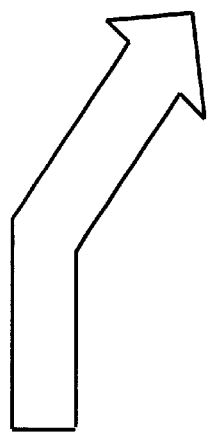
FIG. 5 shows the method presented in the invention for a computer network in accordance with FIG. 3.

FIG. 5 shows the method in accordance with the invention for postsynchronization of data with non-uniform scanning intervals in a computer network. The average response time for I/O operations (Z) was calculated based on the largest common interval (30 min.) within the network, and is now summarized with the CPU workload, which was calculated on a 15 minutes basis.

| Date | Start time | Interval | | |
|------|-----------|----------|-----|-----|
| DD/MM | HH.MM.SS | MM.SS | CPU | Z |
| 02/09 | 10.30.00 | 30.00 | | 0.4 |
| 02/09 | 10.30.00 | 14.59 | 17.9 | |
| 02/09 | 10.45.00 | 14.59 | 17.8 | |
| 02/09 | 11.00.00 | 30.00 | | 3.6 |

In step 1 the performance data are sorted by start time in ascending order and by actual scanning interval in descending order. In the preceding table the data are already sorted according to that rule.

In step 2 a first common time interval is defined. The first common time interval for the measurements with the start time 10.30 is from 10.30 to 11.00. Based on the sort as presented in the invention, this time interval is unambiguously defined.

| 02/09 | 10.30.00 | 30.00 | 0.4 |
|-------|----------|-------|-----|

Common time interval from 10.30.00 to 11.00.00.

In step 3, a check is made to determine which additional performance data with differing scanning intervals can be assigned to this first common time interval. This is effected in the present example by means of the mid point check. If the mid point of the scanning interval falls within the common time interval, it can be assigned to the common time interval. For the present example the assignment check is effected as follows:

| –02/09 | 10.30.00 | 14.59 | 17.9 |
|--------|----------|-------|------|

Mid point of interval from 10.30.00 to 10.44.59 is 10.37.29.5. The mid point 10.37.29.5 falls within the common time interval (10.30.00<=19.37.29.5.<=11.00.00). Consequently:

| 02/09 –02/09 | 10.30.00 10.4500 | 30.00 14.59 | 17.9 17.8 | 04 |
|--------------|------------------|-------------|-----------|-----|

Mid point of interval from 10.45.00 to 10.59.59 is 10.52.29.5. The mid point 10.52.29.5 falls within the common time interval (10.30.00<=10.52.29.5<=11.00.00).

In step 4 a check is made to determine whether there is already a value for the CPU value in the common interval. If so, the existing value is replaced by the new value. Consequently:

| 02/09 –02/09 | 10.30.00 11.00.00 | 30.00 30.00 | 17.9 | 0.4 3.6 |
|--------------|-------------------|-------------|------|---------|

Midpoint of interval from 11.00.00 to 11.30.00 is 11.15.00. The mid point 11.15.00 does not fall within the common time interval (11.15.00>11.30.00 end time of common time interval).

New common interval: from 11.00.00 to 11.30.00.

The inventive process repeats from step 3 until all performance data have been processed.

The invention has been described with reference to specific implementations, but may be modified without departing from the spirit and scope as set forth in the appended claims.

What is claimed is:

1. A method to synchronize performance data of a computer network system comprising at least two single systems, wherein the performance data are defined by at least two performance characteristics of each single system and are saved as a single system response on one system by means of a common, network-wide clocked scanning interval requested by each single system, together with at least the date and start time of the scanning interval and the actual duration of the scanning interval, comprising the steps of:
   a) reading the performance data and date, start time and duration of the actual scanning interval for the performance data for each of the at least two single systems;
   b) establishing a common time interval for the performance data, wherein the common time interval is composed of the actual scanning interval including a defined tolerance range;
   c) identifying the performance data of a single system for which the actual scanning interval does not exceed the defined tolerance range;
   d) assigning the performance data in accordance with step c) to the respective common time interval; and
   e) representing the results in accordance with step d).

2. The method of claim 1 wherein said reading comprises organizing performance data by start time in ascending order and by actual scanning interval in descending order.

3. The method of claim 2 wherein said establishing comprises the steps of:
   aa) setting the first actual scanning interval of the first read performance data as the first common time interval;
   bb) assigning each subsequent performance datum to the first common time interval for which the actual scanning interval does not exceed a defined range about the first actual scanning interval;
   cc) defining a next actual scanning interval for subsequent performance data which exceeds the defined range about the first actual scanning interval as the next common time interval;

dd) repeating steps aa)—cc) until all performance data have been assigned to a common time interval.

4. The method of claim 1 wherein only those performance data for which the actual scanning interval overlaps with the respective common time interval are assigned to the common time interval.

5. The method of claim 3 wherein only those performance data for which the actual scanning interval overlaps with the respective common time interval are assigned to the common time interval.

6. The method of claim 1 wherein only those performance data for which the mid point of their actual scanning interval falls within the common time interval are assigned to the common time interval.

7. The method of claim 3 wherein only those performance data for which the mid point of their actual scanning interval falls within the common time interval are assigned to the common time interval.

8. The method of claim 1 wherein only those performance data for which the actual scanning interval mainly overlaps with the common time interval are assigned to the common time interval.

9. The method of claim 3 wherein only those performance data for which the actual scanning interval mainly overlaps with the common time interval are assigned to the common time interval.

10. The method of claim 1 wherein the results are prepared in tabular form sorted be start time.

11. The method of claim 1 wherein a graphical diagram for representation of the performance data is automatically generated.

12. The method of claim 1 further comprising using the results in a report generator for capacity and performance analysis.

13. The method of claim 1 further comprising using the results to adjust a computer network system.

14. The method of claim 1 wherein the performance data may include a plurality of definable characteristic performance data of a data processing system.

15. The method of claim 1 wherein the performance include the CPU workload and the average response time for I/O operations.

16. A program storage device readable by machine, tangibly embodying a Program of instructions executable by the machine to perform method steps for synchronizing performance data of a computer network system, the method steps comprising:

a) reading the performance data and date, start time and duration of the actual scanning interval for the performance data for each of the at least two single systems;

b) establishing a common time interval for the performance data, wherein the common time interval is composed of the actual scanning interval including a defined tolerance range;

c) identifying the performance data of a single system for which the actual scanning interval does not exceed the defined tolerance range;

d) assigning the performance data in accordance with step c) to the respective common time interval; and e) representing the results in accordance with step d).

* * * * *